July 30, 1935.   C. E. SCHUTTE   2,009,637
VEHICLE BODY CONSTRUCTION
Filed May 8, 1933
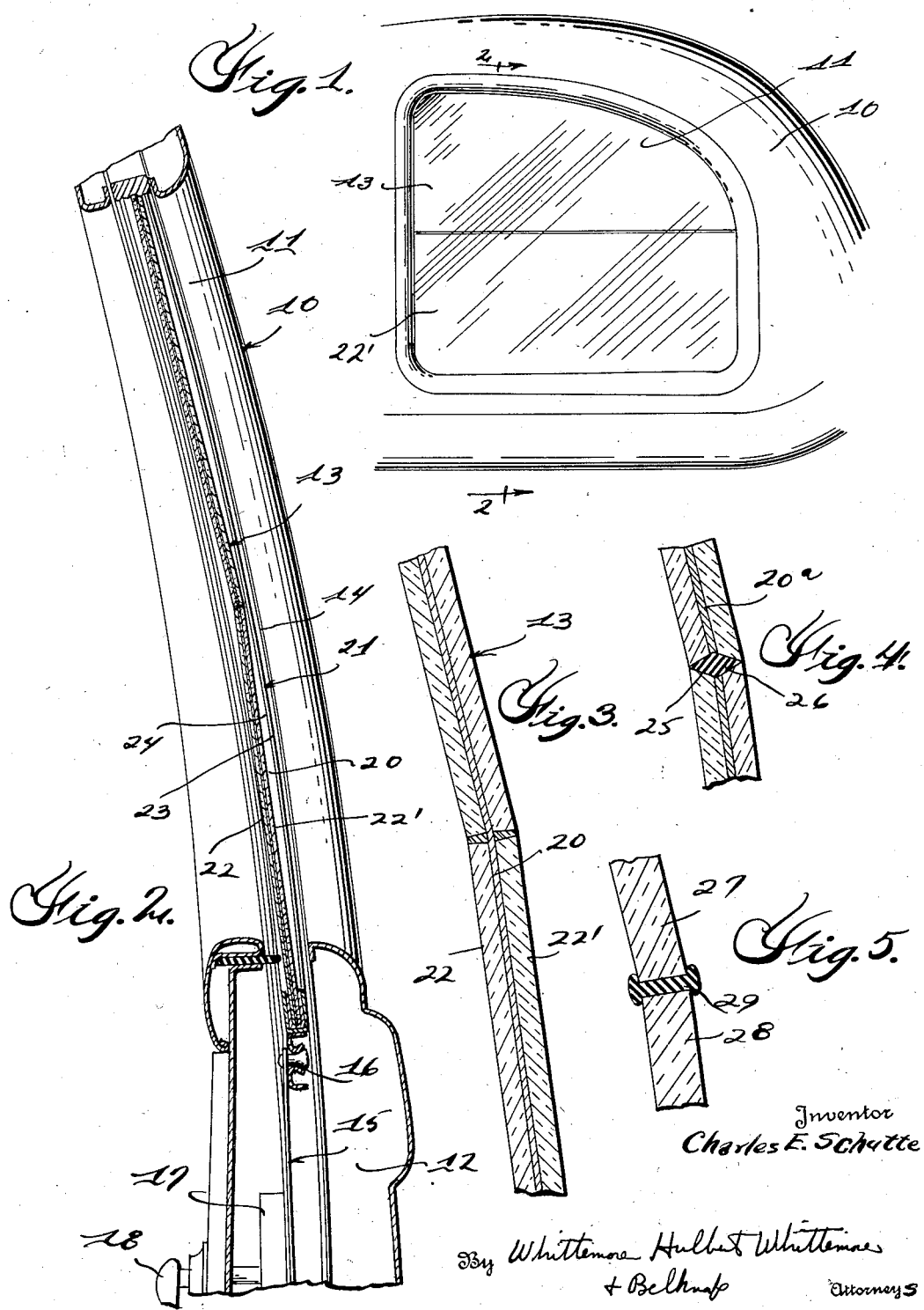

Patented July 30, 1935

2,009,637

UNITED STATES PATENT OFFICE 2,009,637

VEHICLE BODY CONSTRUCTION

Charles E. Schutte, Detroit, Mich.

Application May 8, 1933, Serial No. 670,001

8 Claims. (Cl. 296—48)

This invention relates generally to vehicle bodies and refers more particularly to improvements in the mounting of glass or other transparent panels in bodies of the closed type.

With the steadily increasing popularity of vehicle body designs embodying the aerodynamic principles, it is highly desirable to not only taper the rear end portions of the body inwardly with respect to the longitudinal center line of the vehicle, but to also impart a substantial degree of curvature to the sides of the body with respect to the vertical. In the past, it has been impractical to curve the sides of the body in the manner stated above since such practice was considered to necessitate correspondingly curving the glass panels for the window openings in the body, and the use of curved glass for this purpose is extremely objectionable not only because of the additional cost involved, but also because the reflection characteristics of curved glass are relatively high as compared to the conventional straight glass panels. In order to avoid the use of curved glass and at the same time to impart some degree of curvature to the sides of the body, it has been proposed to increase the width of the body pillars to such an extent as to permit sliding the glass in a common plane diagonally with respect to the curved pillars, but this proposition is also objectionable not only due to the fact that the degree of curvature secured thereby is negligible, but also because pillars having the necessary width to afford such practice, materially interfere with vision.

It is, therefore, one of the principal objects of this invention to provide for imparting the desired degree of curvature to the sides of the body without the necessity of utilizing curved glass and by employing pillars of sufficient width only to afford the necessary structural strength. The foregoing is accomplished without sacrificing the vertical height of the window opening by forming the glass closures of a plurality of plane sections having the adjacent edges connected together with the sections extending at an angle to each other so as to permit the unit to follow an arcuate path in the sides of the body.

In addition to the foregoing, the feature of imparting an arcuate contour to the sides of the body with respect to the vertical offers the possibility of increasing the width of the body at or near the belt line where maximum width is most desired for shoulder clearance without correspondingly increasing the cubic content of the body owing to the fact that the upper portions of the sides of the body turn in a considerable distance with respect to the vertical. In other words, the present invention provides for economizing on the space in the body which is actually not needed and thereby permits imparting a narrower appearance to the body without actually sacrificing the seat width in the body. The above is extremely desirable when designing a streamlined body since it provides for obtaining the desired tapering of the body without sacrificing the width of the body at the points where this dimension is most desirable.

The foregoing as well as other objects will be made more apparent as this description proceeds, especially when considered in connection with the accompanying drawing, wherein:

Figure 1 is a fragmentary elevational view of the rear quarter section of a vehicle body constructed in accordance with this invention;

Figure 2 is a sectional view taken substantially on the line 2—2 of Figure 1;

Figure 3 is a fragmentary enlarged sectional view of the glass panel shown in Figure 1;

Figure 4 is a view similar to Figure 3 showing a slightly modified form of construction;

Figure 5 is a view also similar to Figure 3 showing still a further modified form of construction.

Although it will be apparent as this description proceeds that the window unit constructed in accordance with this invention may be employed in association with any one or all of the window openings in a vehicle body, nevertheless, for the purpose of simplicity, I have restricted the illustration of the closure unit to one of the rear quarter windows of a vehicle body. In detail, there is fragmentarily shown in Figure 1 a vehicle body having a rear quarter section 10 formed with a window opening 11 therethrough and having a compartment 12 between the inner and outer body panels below the window opening. In accordance with conventional practice, the window opening is normally closed by a transparent panel 13 having the opposite side edges slidably engaging suitable guides or runways 14 for movement from a position within the opening to a position within the compartment 12. The runways 14 are substantially channel-shaped in cross section and are suitably secured to the opposite side edges of the opening in such a manner as to guide the transparent panel throughout the aforesaid movement thereof.

Sliding movement of the transparent panel with respect to the opening 11 through the body may be accomplished by the use of any of the well known types of window regulators, and for the purpose of illustration, the conventional lifter arm type of regulator is utilized. In general, the mechanism is located within the compartment 12 of the body and comprises an arm 15 having a roller at one end for engaging within a suitable channel 16 fixedly secured to the bottom edge of the panel 13. The opposite end of the arm is operatively connected to the lifter mechanism designated generally by the reference character 17, and the latter is in turn connected to a suitable operating handle 18 conveniently mounted upon the inner side of the body for manipulation.

In constructions of the type briefly outlined above, it has been the practice to slide the glass panel in a common plane from its position within the window opening to its position into the compartment below the opening. This is objectionable in that it materially limits the design of the vehicle body and prohibits imparting the degree of curvature to the sides of the body required to effectively achieve the aerodynamic or streamlined principles. In order to eliminate the above restricting factor in designing vehicle bodies, it has been proposed to utilize closures for the window openings in the form of glass panels having a degree of curvature corresponding substantially to the degree of curvature of the sides of the body. This proposition has never received recognition in the trade due to the fact that curved glass is not only expensive to manufacture and install, but also because of its high reflection characteristics.

In order to eliminate the objection of curved glass noted above, it has also been proposed to impart a certain degree of curvature to the sides of the body and at the same time provide for moving the closure in a common plane with respect to the window opening. This proposition is also objectionable not only because the degree of curvature secured thereby is necessarily slight, but also because it requires increasing the width of the sides of the body as well as the body pillars in order to afford straight line sliding movement of the closure in the arcuate space between the body panels. Increasing the width of the sides of the body including the pillars is obviously undesirable since it not only increases the cost of manufacture of the body, but also impairs visibility. The present invention contemplates imparting the desired degree of curvature to the sides of the body while at the same time eliminating the objections of both the propositions previously set forth. In this connection, attention is again respectively directed to Figure 2 wherein it will be noted that the upper side portions of the body are curved to a substantial degree with respect to the vertical, and the runways 14 for the closures 13 are correspondingly curved so that the aforesaid sides may be of sufficient width only to afford the desired structural strength. Inasmuch as the runways extend in an arcuate path with respect to the vertical, it necessarily follows that the closure member must be moved in a path corresponding to the degree of curvature of the runways, and in order to accomplish this result without resorting to arcuate shaped closure members, I provide the following construction.

As shown particularly in Figure 3, the transparent closure member 13 is formed from a panel of safety glass of the type comprising two superimposed layers of glass having the adjacent surfaces bonded together by a suitable transparent material which will be referred to herein as the core 20. In accordance with this invention, the layer of glass on each side of the core 20 is formed of two plane sections 22 and 22'. The latter sections are united together by the core to form a unit and are extended at an angle to each other predetermined in dependence upon the particular installation. The space between the adjacent edges of the sections is very small and may be filled with a suitable plastic material if desired in order to weatherproof the portion of the core connecting the two sections. If desired, the filler may be colored so as not to be noticeable, and owing to the fact that the space within which the same is disposed is extremely small, it will not interfere with visibility.

In order to support the glass panel within the runways 14, I provide a suitable frame 21 having side bars 23 substantially channel-shaped in cross section and having a degree of curvature corresponding to the degree of curvature of the runways. The width of the bars 23 between the legs of the channel is such as to receive the adjacent angularly arranged edges of the sections forming the panel, and a suitable filler 24 is preferably inserted within the space between the aforesaid edges and adjacent portions of the side bars 23 of the frame. It will be observed that the foregoing provides an extremely simple solution to the problem of imparting a substantial degree of curvature to the upper portions of the body containing the window openings and at the same time provide sliding closures for the openings devoid of curvature. It will also be apparent that by forming the closures of angularly arranged plane sections in the manner previously set forth, the rays of light will be reflected thereby at a more favorable angle or, in other words, there will be less tendency for light reflected by the closures from shining in the eyes of the occupants of the vehicle. In addition, it is to be noted that by reason of the above construction, the maximum width of the body is at the point where such width is most desired or, in other words, at the belt line of the body and that the width of the body in the upper regions thereof is considerably less which is extremely desirable from the standpoint of appearance.

In Figure 4 of the drawing, I have shown a slightly modified form of closure, and this embodiment of the invention differs from the one previously described in that the core 20ª for the safety glass is also split horizontally or, in other words, is not common to both sections of the glass panel. In the construction shown in Figure 4, the adjacent edges of the two sections of the panel are formed so as to provide substantially V-shaped recesses 25 cooperating in the assembled relation of the sections to provide a substantially closed space for receiving a suitable filler 26. If desired, the filler 26 may be in the form of rubber molded in place so as to form in effect a bond between the adjacent edges of the two sections.

In Figure 5, I have illustrated the manner in which two sections of plain glass may be employed in the frame 23 to form a closure for the opening in the body. In this connection, it is to be noted that the two sections 27 and 28 of the glass panel are more or less independent of each other, and the space between adjacent edges thereof is weatherproofed by means of a strip of rubber or other suitable material designated herein by the reference character 29.

The foregoing are only a few of the numerous different types of constructions that may be employed in obtaining the results hereinbefore described, and, accordingly, reservation is made to make such changes in the details of construction as may come within the purview of the accompanying claims.

What I claim as my invention is:

1. A vehicle body having a window opening therein, runways at opposite sides of the opening extending in an arcuate path with respect to the vertical, means forming a closure for the opening including a plurality of glass panels having plane surfaces located in the window opening one above the other and having the opposite sides slidably engaging the runways with the plane surface of one section arranged at an angle to the plane surface of the other section, and a filler between adjacent edges of the panels.

2. A vehicle body having a window opening therein, runways at opposite sides of the window opening extending in an arcuate path with respect to the vertical, means for closing the window opening including a plurality of panels having plane surfaces located in the opening one above the other with the opposite edges thereof slidably engaging the runways, each of said panels formed of laminations of glass bonded together by a transparent core common to all of the panels for securing the same together.

3. A transparent closure for window openings, comprising panels having plane surfaces arranged at an angle to each other in the window opening with the adjacent edges in juxtaposition to each other, each of said panels formed of laminations of glass bonded together by a core common to all of said panels for securing the same together.

4. A transparent closure for window openings, comprising panels having plane surfaces arranged at an angle to each other in the window opening one above the other with the adjacent edges in juxtaposition to each other, each of said panels formed of laminations of glass bonded together by a core common to all of said panels for securing the same together, and a filler between the adjacent edges of the panels on opposite sides of the core.

5. The combination with a window opening having relatively narrow curved runways at opposite sides thereof, of a closure for the window opening having the opposite side edges thereof slideably engaging within the runways and comprising angularly disposed plane sections extending substantially tangentially from the sides of greater curvature of the runways and having the adjacent edges thereof fixed with respect to each other.

6. The combination with a window opening having relatively narrow curved runways at opposite sides thereof, of a frame having curved side members substantially channel shaped in cross section and slidably engaging within the runways aforesaid, a closure for the frame having its opposite side edges projecting into the channels of the aforementioned frame members and comprising angularly disposed plane sections extending substantially tangentially from the sides of greater curvature of the channels and having the adjacent edges fixed with respect to each other.

7. A vehicle body having a side curved with respect to the vertical and having a window opening through said side, relatively narrow runways at opposite sides of the window opening extending in an arcuate path with respect to the vertical, and a closure for the window opening slidably mounted in the runways and comprising angularly disposed plane transparent panels extending substantially tangentially from the sides of greater curvature of the runways to a position adjacent the opposite sides of the runways and having the adjacent edges thereof connected together.

8. A vehicle having a side wall curved with respect to the vertical and having a window opening through said wall, relatively narrow runways at opposite sides of the window opening extending in an arcuate path with respect to the vertical, a curved frame having inwardly opening channel shaped side members slidably engaging within the runways, a closure for the frame comprising plane glass sections having the opposite side edges located within the channels of the aforementioned frame members, said sections disposed at an angle to each other and extending substantially tangentially from the sides of greater curvature of the channels to a position adjacent the opposite sides of said channels and having the adjacent edges connected together.

CHARLES E. SCHUTTE.